Figure 1:
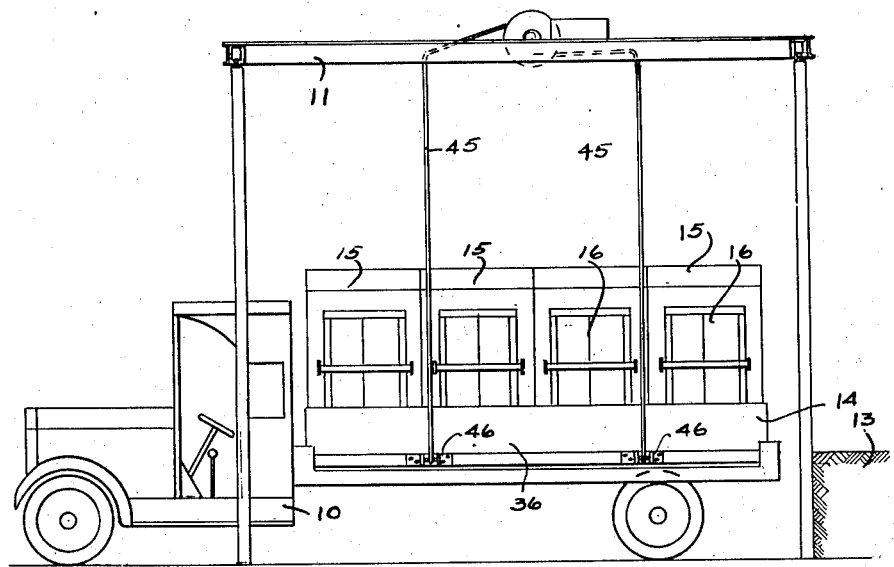

Jan. 4, 1927.

B. F. FITCH 1,613,387

MEANS FOR TRANSPORTING FREIGHT

Filed August 27, 1925    4 Sheets-Sheet 1

Inventor

Benjamin F. Fitch

By Baker, Macklin, Golrick & Tear
Attorneys

Jan. 4, 1927.

B. F. FITCH 1,613,387

MEANS FOR TRANSPORTING FREIGHT

Filed August 27, 1925    4 Sheets-Sheet 2

Jan. 4, 1927.

B. F. FITCH 1,613,387

MEANS FOR TRANSPORTING FREIGHT

Filed August 27, 1925   4 Sheets-Sheet 3

Inventor
Benjamin F. Fitch,
By Baker, Macklin, Golrick & Hearn
Attorneys

Jan. 4, 1927.　　　　　　　　　　　　　　1,613,387
B. F. FITCH
MEANS FOR TRANSPORTING FREIGHT
Filed August 27, 1925　　4,Sheets-Sheet 4
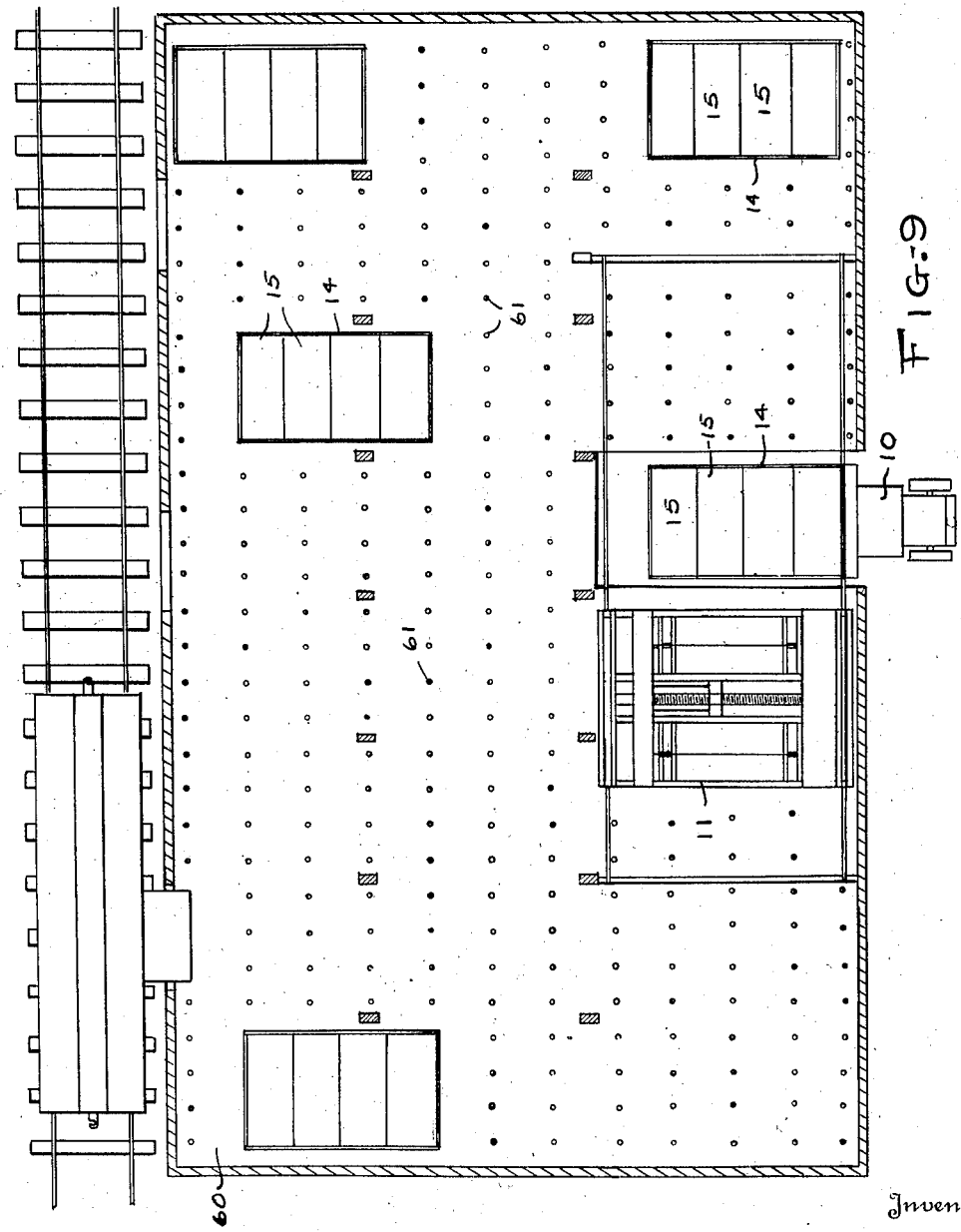

Patented Jan. 4, 1927.

1,613,387

UNITED STATES PATENT OFFICE.

BENJAMIN F. FITCH, OF GREENWICH, CONNECTICUT.

MEANS FOR TRANSPORTING FREIGHT.

Application filed August 27, 1925. Serial No. 52,846.

The employment of removable automobile bodies as containers for package freight permits the utilization of buildings for freight storage and rehandling in localities where the expense of rail track terminals would be prohibitive. Temporary storage of containers in such off-track buildings relieves the rail head terminals and also reduces the consignee's charges over those necessary in the usual system of breaking bulk and warehouse storing.

The over-all clearance between the floor and ceiling in many existing buildings precludes the use of individual crane trackways for handling heavy loaded bodies. Moreover, in the extension of such freight handling system for store door delivery, where the quantity of freight handled by any individual consignee is not sufficient to justify an entire automobile body, it is desirable to use small size unit containers.

To permit the handling of small containers in an expeditious manner without requiring the use of expensive crane equipment by each consignee, is the principal object of the present invention. A further object is the provision of means for enabling a plurality of containers to be handled as a unit between a truck and a station platform, so as to obviate the necessity for a truck being idle during the loading or unloading operation.

I carry out the above objects by employing small sized containers having supporting rollers, preferably ball bearing casters adjacent the corners thereof, and I employ a tray upon which the containers may be supported. The tray may have sides which extend a slight distance above the bottom of the containers, while some of the sides are hinged at the bottom to provide a ramp across which the containers may be rolled. The bottom of the tray on the underside may have guideways which are adapted for alignment with ball bearing casters which in turn are arranged in parallel rows upon the storage floor.

The containers may be moved about independently of the tray, yet the tray either loaded or unloaded may be moved about in a storage warehouse or station platform without requiring the use of an overhead traveling crane. The tray also functions to permit handling of a group of containers as a unit, where such group movement is desired.

Figure 2:
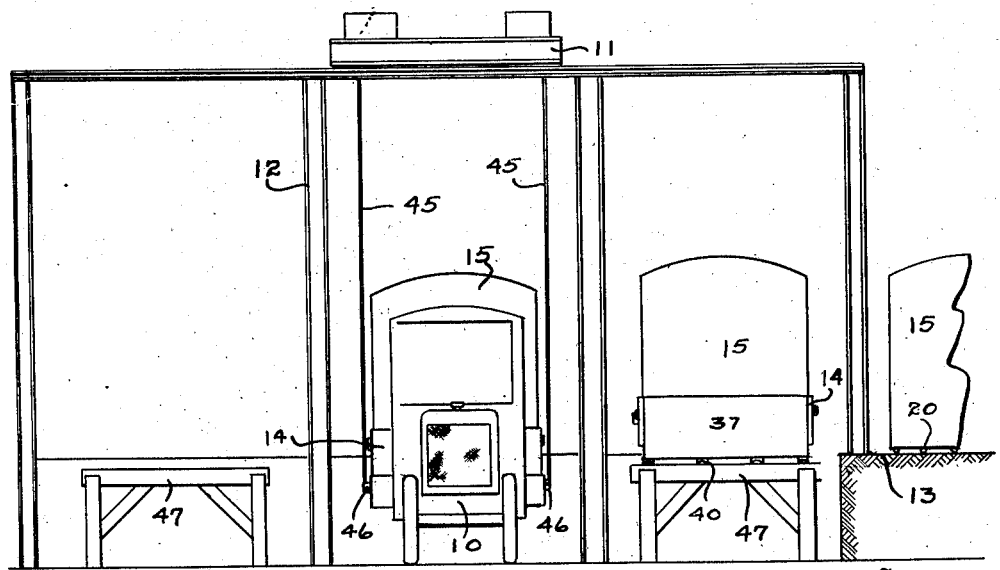
Figure 3:
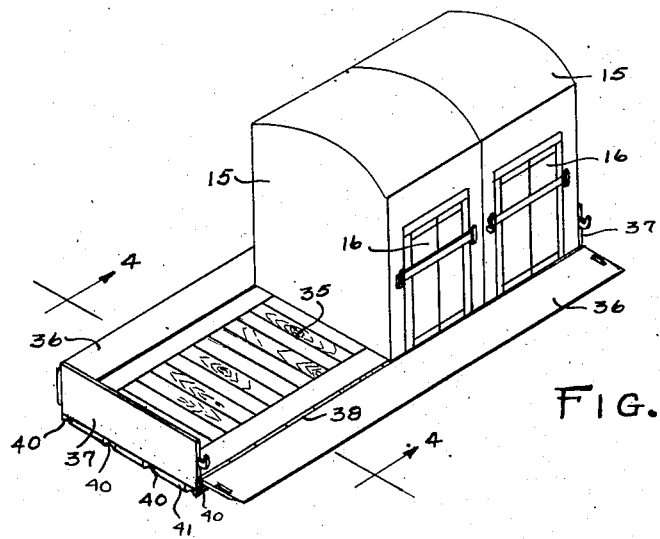
Figure 4:
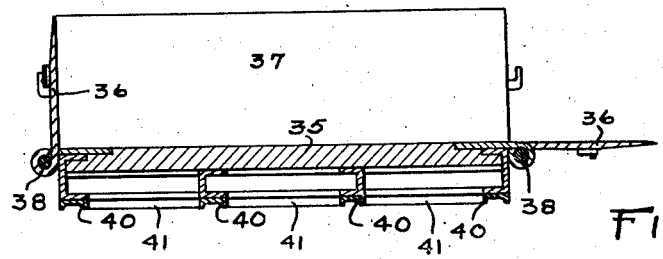
Figure 5:
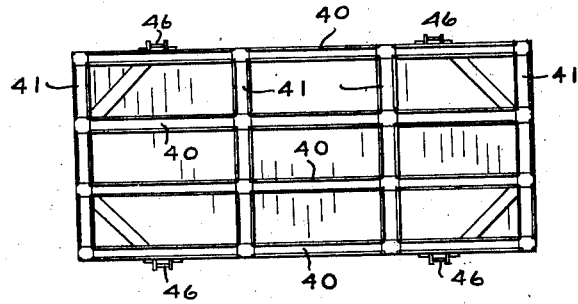
Figure 6:
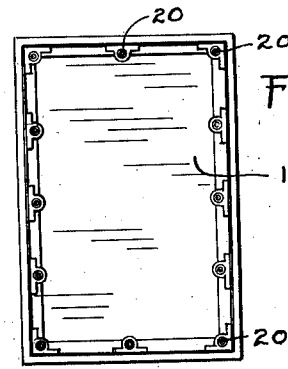
Figure 7:
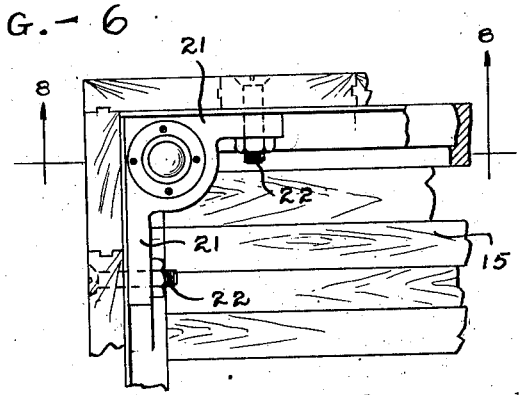
Figure 8:
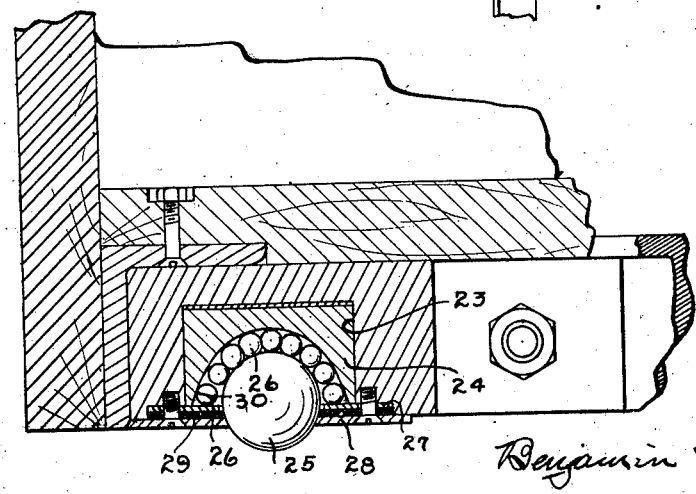

Referring now to the drawings, Fig. 1 is a side view of a motor truck having a plurality of containers mounted upon a tray which is made in accordance with my invention; this view showing also means for lifting the tray and containers as a unit; Fig. 2 is an end view of the apparatus shown in Fig. 1, and illustrating an arrangement of hoisting apparatus to facilitate handling of the containers as a group; Fig. 3 is a perspective view of the tray with some of the containers removed and showing one of the tray sides in lowered position; Fig. 4 is a section taken on a plane indicated by the line 4—4 in Fig. 3; Fig. 5 is a bottom plan view of the tray; Fig. 6 is a bottom plan view of a container; Fig. 7 is a bottom plan view on an enlarged scale showing a portion of a container adjacent the corner thereof; Fig. 8 is a section also on an enlarged scale taken on a plane indicated by the line 8—8 in Fig. 7; and Fig. 9 is a plan view of a station platform having casters in the floor for use with my invention.

In Fig. 1, I have shown a motor truck 10 which is mounted beneath an overhead crane indicated in general at 11. The crane, as illustrated, is supported upon columns 10 adjacent a truck platform 13. The truck is illustrated as having a tray 14 upon which containers 15 are positioned. These containers are smaller than a truck body, but each may have a door 16 which is automatically locked when the sides of the tray are closed.

Referring now to Figs. 6 to 8, each container is illustrated as having casters 20 adjacent the bottom thereof to permit handling of the container upon a smooth floor. In the preferred form the casters comprise a housing 21 which may be attached to the container by securing means 22, and which may have an opening 23 into which a bearing block 24 may extend. A ball caster 25 may extend partially into the block 24, and be journaled in anti-friction members, such as small ball bearings 26, illustrated in Fig. 8. Retaining plates 27 and 28 separated by a felt washer 29, function to retain the anti-friction members in position between the caster and the slot.

To permit rotation of the anti-friction members between the caster and block, I have shown the block as having a circumferential recess 30 which is somewhat larger than the diameter of the small anti-friction members. This permits the member to roll around the space between the caster and block without causing the members to jam against one side of the block during the rolling operation.

To permit handling of a plurality of containers as a unit, I have shown a tray having a bottom 35 with side walls 36 and end walls 37. The side walls may be hinged to the bottom, as at 38, to provide a ramp across which the containers may be rolled while being transferred between the tray and the station platform.

The rim of the tray, as illustrated, has guideways 40 and 41 which may comprise inverted channel beams and which extend at right angles to each other. These beams are adapted to engage ball casters which are positioned at spaced intervals and in rows upon a platform, or other supporting surface. In this way, a tray with a load of containers thereon may be pushed easily along the platform by hand thus obviating the necessity for an overhead traveling crane for transportation purposes.

To illustrate the use to which a tray and container combination embodying my invention may be put, reference may be had to Fig. 2 wherein the tray is shown upon the truck and as being engaged by cables 45 at spaced points 46. From this position the tray and the containers as a unit may be raised and then transported laterally and deposited upon a support 47 adjacent the platform 13. If one of the sides 36 is lowered, the containers may then be rolled by hand off the tray and onto the platform.

In Fig. 9, I have shown a station platform 60 having ball castors 61 mounted therein in such manner that only a small portion of the castor projects above the floor. These castors are arranged in parallel rows and the rows are arranged at right angles to each other and are in alignment with the guideways 40 and 41 as shown in Fig. 5. This permits a loaded container to be moved manually across the platform without necessitating the use of an overhead crane except at the truck pit where the containers are transferred between a truck and the platform.

A platform installation similar to that just described is illustrated and claimed in my copending application, Serial No. 39,429 filed June 25, 1925, wherein the container, instead of the tray, has parallel guideways which engage rows of ball casters in a floor.

An important advantage of the present invention is the facilities afforded for handling package freight in quantities less than a full truck load. For example, the small containers may be readily moved by hand across a station platform without employing an overhead crane, while the sides of the tray provide an effective ramp across which a container may be moved to transfer it between the platform and a motor truck. The sides of the tray, after functioning as a ramp, may be swung upwardly to a vertical position and locked to the ends of the tray. By making the sides of the tray sufficiently high, the doors of the container may be automatically locked by the tray.

After a loaded truck is brought to a storage warehouse or to a station platform, then all of the containers may be raised as a unit by lifting the tray with an overhead crane and moving it from the truck to the platform. If the platform is provided with ball casters, then the loaded tray may be moved about the platform by hand. This obviates the necessity for unloading the container near the truck and facilitates freight movement to a considerable degree.

I claim:

1. In combination, a container, a portable supporting member therefor having means for attachment of a lifting device, means on the container for allowing it to be rolled onto or off of the supporting members, and a truck having means for positioning the supporting member thereon, the supporting member being movable independently of the truck.

2. In combination, a plurality of containers, rollers in the base of the container for allowing it to be rolled along a supporting surface, a portable tray adapted to contain a plurality of containers and having means for attachment of a lifting device and a truck having means for positioning the tray.

3. In combination, a container, a supporting member therefor, a truck having means for positioning the supporting member thereon, and the supporting member being removable from the truck, said member having a floor and an upstanding side, at least one of the sides being hinged to the floor to provide a ramp and means on the container for allowing it to be rolled across the ramp, and onto or off the floor of the supporting member.

4. In combination, a plurality of containers, means on each of said containers for allowing it to be rolled along a supporting surface, a tray adapted to contain a plurality of containers, said tray having a floor, side and end walls, the side walls being hinged to the floor and being adapted, when lowered to provide a ramp for the containers, each of said containers having a door associated therewith, and said doors being automatically locked whenever the containers are placed upon the tray, and the sides are locked in upright position, and a truck having means for removably positioning said tray.

5. In combination, a container, a portable supporting member therefor, roller means mounted on the container for enabling it to be moved onto or off of the supporting member, a floor having roller means disposed at spaced intervals thereon and in rows at right angles to each other, said supporting member having guideways on the bottom thereof, said guideways being in alignment with the rows of roller members on said floor.

6. In combination, a container, a tray comprising a supporting member therefor, said tray having a floor and an upwardly extending wall, said wall being hinged to the floor and adapted, when lowered, to provide a ramp, roller means mounted on the container for enabling it to be moved along the ramp and onto or off the tray, a tray supporting surface having roller means disposed at spaced intervals thereon, and in rows at right angles to each other, said tray having guideways on the bottom thereof, and said guideways being in alignment with the rows of roller members on said supporting surface, whereby the tray with a container thereon may be moved manually across said supporting surface.

7. The combination of a station platform having rollers in its floor, of a tray having guideways on its under side adapted to register with the rollers, a truck having positioning means adapted to register with the tray, and a plurality of containers adapted to be mounted on the tray.

8. The combination of a station platform having rollers in its floor arranged in parallel rows the rollers in different rows aligning in a direction transverse to that of the rows, of a tray having guideways on its under side adapted to register with the rollers, a truck having positioning means adapted to register with the tray, and a plurality of containers having rollers in their respective bases adapted to roll onto the tray.

9. In combination, a station platform having roller members in its floor and having a truck pit associated therewith, a tray having guideways on the bottom thereof in alignment with said roller members, and a plurality of containers adapted to be mounted on said tray.

10. In combination, a station platform having roller members in its floor, a trackway, an overhead crane adapted to travel on said trackway, a tray adapted to be engaged by said crane and deposited on the rollers or removed therefrom, said tray having guideways on the bottom thereof adapted to register with the rollers, and a plurality of containers adapted to be mounted on the tray.

11. In combination, a station platform having roller members in its floor arranged in parallel rows, the members in the different rows aligning in rows disposed at right angles to the rows first mentioned, a pit intersecting the platform, a trackway, an overhead crane adapted to travel on said trackway over the pit and over adjacent rollers, a tray adapted to be engaged by said crane and deposited on the rollers or removed therefrom, said tray having guideways on the bottom thereof adapted to register with the rollers, and a plurality of containers adapted to be mounted on the tray.

12. In combination, a station platform having a truck pit associated therewith, and having roller members in the floor thereof, said members being arranged in parallel rows, and the members in different rows being disposed in rows at right angles to the rows first mentioned, a trackway, an overhead crane adapted to travel over the truck pit and over rows of roller members in the platform adjacent to the truck pit, a tray having guideways on the bottom thereof in alignment with said roller members, said tray having a floor and a side wall, the wall being hinged to the floor, a container having roller means associated therewith for enabling the container to be rolled onto and off said tray.

13. In a freight handling system, a container having walls and a floor, the walls extending lower than the floor, ball bearing balls mounted in casings on the under side of the container, spaced beneath the floor and secured to the side walls of the container.

14. In a freight handling system, a container having walls and a floor, the walls extending lower than the floor, corner brackets beneath the floor secured to two walls at right angles to each other adjacent the corner, and ball bearing casters mounted in the respective corner brackets.

15. A container having side walls, angle beams secured to the inner faces of said walls, a floor supported by the angle beams, corner brackets beneath the floor secured to the two walls adjacent the corner, and ball bearing casters mounted in the respective corner brackets.

16. A portable tray for removable containers comprising a member having a floor on which a plurality of containers may rest, said member being provided with means for attachment of lifting mechanism, and beams on the under side of the floor providing guideways adapted to coact with rollers in a supporting surface.

17. A tray for a freight handling system, comprising a member having a floor, side walls and end walls, the end walls being stationary and the side walls being hinged to the floor and adapted when lowered to provide a ramp and when raised to be fastened to the end walls, the upper surface of said floor being smooth and the lower surface having guideways arranged at right angles to each other.

In testimony whereof, I hereunto affix my signature.

BENJAMIN F. FITCH.